United States Patent [19]

Alberti et al.

[11] 3,901,859

[45] Aug. 26, 1975

[54] PROCESS FOR PREVENTING DISCOLORATION OF OLEFINIC POLYMERS CONTAINING VANADIUM CATALYST RESIDUES

[75] Inventors: Alberto Alberti; Sergio Bacciarelli; Giuliano Ballini, all of Ferrara, Italy

[73] Assignee: The B. F. Goodrich Company, Akron, Ohio

[22] Filed: Jan. 4, 1974

[21] Appl. No.: 430,613

[30] Foreign Application Priority Data

Jan. 4, 1973  Italy .................................. 19035/73

[52] U.S. Cl. ........................... 260/80.78; 260/88.25
[51] Int. Cl.² .......................................... C08F 6/26
[58] Field of Search ............ 260/80.78, 96 R, 88.2 S

[56] References Cited

UNITED STATES PATENTS

| | | | |
|---|---|---|---|
| 2,893,982 | 7/1959 | Campbell .......................... | 260/85.1 |
| 2,962,488 | 11/1960 | Horne ................................ | 260/94.7 |
| 3,481,910 | 12/1969 | Brunson ............................. | 260/78.4 |
| 3,773,743 | 11/1973 | Ainsworth et al. ............. | 260/94.9 F |

*Primary Examiner*—Joseph L. Schofer
*Assistant Examiner*—A. L. Clingman
*Attorney, Agent, or Firm*—J. Hughes Powell, Jr.

[57] ABSTRACT

The discoloration of olefinic polymers containing vanadium catalyst residues is prevented or held to a minimum even after long periods of storage by adding to such polymers a small amount of certain polycarboxylic acids and salts, polyalcohols, oxyacids and their salts, hydroxyl amine and boric acid.

10 Claims, No Drawings

PROCESS FOR PREVENTING DISCOLORATION OF OLEFINIC POLYMERS CONTAINING VANADIUM CATALYST RESIDUES

BACKGROUND OF THE INVENTION

It is known that olefin polymers, particularly ethylene-propylene copolymers and EPDM polymers prepared with catalysts based on vanadium compounds tend to develop color of various shades after a period of time, particularly when such polymers contain vanadium catalyst residues in amounts greater than about 20 parts per million of vanadium. This tendency to discolor, and the color, is believed to be the result of a complex reaction which vanadium compound residues undergo in the presence of alkyl aluminum compounds employed as co-catalysts, traces of other metals and impurities, molecular weight modifiers, antioxidants, air, water and the like. To date, attempts to solve this problem have been related to removing the vanadium residues from the polymers, which normally is attempted in purification and washing processes. Such steps complicate the production processes, represent heavy capital investment in equipment and add considerably to the cost of the polymers. Less expensive, more easily conducted procedures for providing olefin polymers which do not discolor on aging when containing vanadium residues are desired.

SUMMARY OF THE INVENTION

It has now been found that olefin compounds containing vanadium residue in amounts from about 20 to 300 parts per million can be maintained in a colorless or only lightly discolored state even after long periods of time when there is added to such polymers compounds selected from polycarboxylic acids and their salts, polyalcohols, oxyacids and their salts, hydroxyl amine and boric acid.

DETAILED DESCRIPTION

The additives can be added to the olefin polymers after stripping and washing operation by any methods known to those skilled in the art. Preferably, these materials are mixed with the polymers at a stage after excess monomers and liquids have been removed but before the polymers have been dried. These additives are readily mixed with the polymers at temperatures in the range of about 80°C. to about 200°C. at a stage in the process before the polymers are completely dried. Intimate contact between the polymers and additives is readily obtained by mixing the polymer in a polymer drier wherein the finished product freed from water, solvent or monomer residues is provided. By this manner maximum contact and protection is obtained saving both equipment and additive cost as well as time. The resulting polymers remain substantially colorless even after long periods of storage. It should be obvious that the additives could be added after the drying step but since discoloration may be obtained during the drying step it is preferred to be added just prior to or during the drying step. The polymer thus obtained is substantially colorless and remains unchanged for long periods of time.

When olefin polymers containing more than 20 ppm of vanadium are not treated according to the present invention, a color change occurs in a rather short time. The copolymer assumes a very intense coloring generally varying from green to brown. The product exhibiting such coloring is not commercially acceptable. According to the processes of the art, a purification step was needed to remove the catalyst residues.

The additives of this invention may be used either separately or combined with one another, in amounts which depend on the quantity and nature of the catalytic residues, on the mixing equipment utilized and on the mixing temperature and time. The amounts of additives employed generally vary from 0.05 to 10 parts by weight, preferably from 0.1 to 1 part by weight, per 100 parts of polymer.

The useful additives are certain polycarboxylic acids and salts, polyalcohols, oxy acids and their salts, hydroxyl amine and boric acid. Better results are obtained when these acids and alcohols contain 2 to 8 carbon atoms, preferably 4 to 6 carbon atoms, and 2 or more of either hydroxyl or carboxyl groups, more preferably, at least one of hydroxyl, and carboxyl, there being a total of at least 3 such groups in the preferred compounds. Useful additives are glycerol, sorbitol, ethylene glycol, citric acid, tartaric acid, oxalic acid, glycolic acid, sodium gluconate, hydroxyl amine chlorohydrate, hydroxyl amine, boric acid. Especially good results have been obtained with sorbitol, tartaric acid, citric acid and gluconic acid either alone or in mixtures with other materials of the nature described. Preferred is tartaric acid.

It has been found that the additives do not adversely affect either the vulcanization process with peroxide or sulfur or the copolymers' aging resistance.

The method of this invention may be utilized in all processes for producing olefin polymers and copolymers based on the use of vanadium catalysts, and carried out either in suspension or in solution.

The vanadium catalysts used to obtain the olefin polymers and copolymers are prepared by reacting a vanadium compound, preferably one soluble in a hydrocarbon solvent, with an alkyl Al-compound such as, for example, aluminum diethyl monochloride, aluminum diisobutyl monochloride and aluminum ethylsesquichloride. Some examples of vanadium compounds are $VCl_4$, $VOCl_3$, V-triacetylacetonate, V-tribenzoylacetonate, vanadyl haloacetylacetonate, vanadyl trialkoxides or haloalkoxides, tetrahydrofuranates, etherates, aminates, pyridinates or quinolates of vanadium tri- or tetrachloride or of vanadyl trichloride. The catalysts contain a certain amount of chlorine that may come from both the vanadium compound and the organic Al-compound. The preferred Al/V ratio is >2.

Hydrogen or alkyl metals, such as zinc alkyl, may be used as molecular weight regulators. Activators, such as halogenated substances selected from the esters of trichloro-carboxylic acids, benzotrichloride etc., may be employed too. The method of this invention is applicable in particular to the processes for the production of copolymers by the technique based on the suspension polymerization. In such a process the copolymerization is in a liquid phase consisting of one of the monomers to be polymerized.

By elastomeric olefinic copolymers it is meant both the saturated copolymers of ethylene with alpha-olefins, in particular ethylene-propylene, containing from 20 to 80 percent by moles of ethylene, and the low unsaturated ethylene/alpha-olefin/polyene terpolymers.

The terpolymers include linear or cyclic diolefins or polyolefins, either with or without endomethylene linkages, with nonconjugated double bonds. Ethylene is present in the terpolymers in amounts ranging from 20 to 80 percent by moles, and diene or polyene in amounts varying from 0.1 to 20 percent by moles usually with propylene. Examples of such polyenes are: 5-ethylidene-norbornene-2, dicyclopentadiene, 1,5-cyclooctadiene, 1,6-heptadiene, norbornadiene, 4,8-dimethyl-1,4,9-decatriene, 2-methyl-pentadiene, 1,5,9-cyclododecatriene, 1,4-hexadiene and 6-methyl-4,7,8,9-tetrahydroindene. The process of this invention is applicable also to the olefin homopolymers obtained by means of catalysts based on vanadium salts.

The Examples given hereinafter predominantly refer to decoloring tests of copolymers in which the color change had already occurred. These tests are then accelerated with respect to those in which the additive is incorporated into the just finished still colorless (co)-polymer. Nevertheless such tests may be considered as indicative of the additives capacity of preventing the coloring of the (co)polymers as it occurs after their preparation.

changed in the long run (more than 4 months after said treatment).

TABLE 1

| Example | Additive | Quantity added to the polymer | Appearance of the polymer |
|---|---|---|---|
| 1 | — | — | dark green — opaque |
| 2 | oxalic acid | 0.5 | light green |
| 3 | ethylene glycol | 0.3 | light green |
| 4 | ethylene glycol | 0.5 | do., lighter color |
| 5 | glycerol | 0.3 | light blue, transparent |
| 6 | glycerol | 0.7 | do. |
| 7 | sorbitol | 0.3 | light yellow, transparent |
| 8 | tartaric acid | 0.3 | colorless, transparent |
| 9 | tartaric acid | 0.3 | colorless — transparent |
|   | glycerol | 0.3 | colorless — transparent |
| 10 | tartaric acid | 0.1 | colorless — transparent |
|    | glycerol | 0.5 | colorless — transparent |
| 11 | citric acid | 0.7 | very light yellow — transparent |
| 12 | sodium gluconate | 0.3 | light straw yellow — transparent |
| 13 | ethylenediamine tetraacetic acid, sodium salt | 0.4 | light greenish yellow |
| 14 | boric acid | 0.5 | light beige |
| 15 | hydroxylamine chlorohydrate | 0.3 | light yellow — transparent |

EXAMPLE 1

An ethylene/propylene/ethylidene-norbornene terpolymer, having a propylene content of 51 percent by weight, ethylidene-norbornene content of 3.5 percent by weight, and a Mooney viscosity ML (1+4 at 100°C.) at 45, was employed. The catalytic residues contained in said terpolymer were as follows: Al - 460 ppm, Zn - 150 ppm, V - 140 ppm, Cl - 800 ppm, Fe - 30 ppm. The polymer, at first almost colorless at the outlet of the suspension polymerization plant, gradually turned into intense green during the storage period. 70 g. of polymers were introduced into the mixer of a Brabender plastograph Model L35 at a temperature of 180°C. and mixed therein for 2 minutes at about 120 rpm. Thereupon the polymer was molded at 150°C. for 10 minutes in order to obtain 4 mm thick sheets. These sheets exhibited a dark green color, were scarcely transparent and tended to become more colored and opaque in the long run.

EXAMPLES 2 TO 15

Following the procedure of Example 1, the same amount of the same polymer (not previously treated) was admixed with Brabender plastograph with the additives indicated in the following table, according to the quantities specified therein. The reagents were added separately or mixed with one another. Both color and transparency of the samples treated remained unchanged in the long run (more than 4 months after said treatment).

EXAMPLE 16

A color stabilization test by addition of glycerol was effected on an ethylene/propylene copolymer at the outlet of the commercial suspension plant. The standard type copolymer had a propylene content of 47 percent by weight, a ML viscosity (1+4 at 100°C.) of 40, and a metal vanadium content of 55 ppm. Glycerol was gradually admixed at the inlet of the drier, at the rate of 0.7 percent by weight with respect to the rubber and at a temperature comprised between 120°C. (inlet temperature) and 180°C. (extrusion temperature). The average residence time of the polymer in the drier section was of about 2 minutes. The color of the treated polymer plate (prepared as illustrated in Example 1) was compared with that of a not treated polymer of the same type: the treated polymer exhibited a lighter color shade (it was practically colorless) and a higher transparency, both characteristics being stable in the long run; conversely, the product not treated tended to darken.

EXAMPLE 17 a. 70 g. of the same terpolymer of Example 1 were introduced into the mixer of a Brabender plastograph Model L3S at 120° to 130°C., and mixed therein for 10 minutes at about 120 rpm. Thereupon the polymer was molded to sheets as illustrated in Example 1. Such sheets showed an opaque dark green color.

b. 70 g. of the same terpolymer of Example 1 were mixed and homogenized in a Brabender plastograph with 1 g. of glycerol (1.5 percent with respect to the polymer) for 10 minutes at 120°C. to 130°C. Thereupon the polymer so treated was molded to sheets exhibiting a transparent light blue color.

c. Test (b) was repeated, but using 1 g. of tartaric acid instead of 1 g. of glycerol. After treatment, the polymer was molded to sheets exhibiting a transparent light blue color.

EXAMPLE 18 a. 70 g. of the same terpolymer of Example 1 were mixed and homogenized in a Brabender plastograph with a mixture of 0.2 g. of glycerol, + 0.2 g. of tartaric acid, at a temperature of 120° – 130°C. for 10 minutes.

Thereupon the polymer obtained was molded to plates which exhibited a transparent light yellow color.

b. Test (a) was repeated, but using a mixture of 0.5 g. of tartaric acid, 0.5 g. of glycerol (the total amount corresponding to 1.5 percent with respect to the terpolymer) instead of 0.2 g. of glycerol + 0.2 g. of tartaric acid. After treatment the polymer was molded to sheets that are colorless and transparent.

EXAMPLE 19 a. Example 17, test (a) was repeated, with the only exception that the mixture was homogenized in a Brabender plastograph for 5 minutes instead of for 10 minutes. The sheets exhibited an opaque dark green color.

b. Test (a) of this Example was repeated by homogenizing for 5 minutes in a Brabender plastograph 70 g. of terpolymer and 0.5 g. (0.75 percent) of glycerol, at 120° – 130°C. After treatment the polymer was molded to plates resulting practically colorless and transparent.

c. Test (b) was repeated, except that employing 0.5 g. (0.75 percent) tartaric acid in place of 0.5 g. of glycerol were employed. The sheets obtained were practically colorless and transparent.

d. Test (c) was repeated except that 0.5 g. (0.75 percent) of ethylene glycol in place of 0.5 g. of tartaric acid were employed. The resulting sheets were practically colorless and transparent.

EXAMPLE 20 a. 70 g. of the same terpolymer of Example 1 were mixed and homogenized in a Brabender apparatus with a mixture consisting of 0.5 g. (0.75 percent) of ethylene glycol and of 0.5 g. (0.75 percent) of tartaric acid, for a 5-minute period at a temperature of 150°C. The sheets were practically colorless and transparent.

b. Test (a) was repeated, but using 1 g. (1.5 percent) of ethylene glycol and 1 g. of tartaric acid instead of the mixture containing 0.5 g. of ethylene glycol + 0.5 g. of tartaric acid. The sheets were practically colorless and transparent.

c. Test (b) was repeated, but using a mixture made up of 0.2 g. of ethylene glycol + 0.2 g. of tartaric acid instead of 1 g. of ethylene glycol and 1 g. of tartaric acid. The sheets obtained were slightly yellow and transparent.

We claim:

1. A process for preventing the discoloring of olefinic polymers containing greater than about 20 parts per million of vanadium catalyst residue comprising adding to said polymers in a solid state, in the substantial absence of liquids, at least one compound selected from the group consisting of (1) polycarboxylic acids and salts thereof, and (2) polyalcohols, said polycarboxylic acids and polyalcohols containing 2 to 8 carbon atoms and at least two hydroxyl or two carboxyl groups with a total of three such groups, (3) hydroxylamine and (4) boric acid.

2. The process of claim 1 wherein the amount of said compound is from about 0.05 to 10 parts by weight per 100 weight parts of polymer.

3. The process of claim 2 wherein the polymer and compound are mixed together at temperatures ranging from about 80°C. to about 200°C.

4. The process of claim 3 wherein the additive is mixed with the polymer while the polymer is being dried in amount from about 0.1 to 1 weight part of compound, and wherein the polycarboxylic acid or polyalcohol contains 4 to 6 carbon atoms.

5. The process of claim 4 wherein said vanadium residue is a vanadium chloride and the polymer is a copolymer containing 20 to 80 percent ethylene, 0.1 to 20 percent by weight of a polyene and propylene.

6. The process of claim 5 wherein said polyene is 5-ethylidene-norbornene-2.

7. The process of claim 6 wherein said additive is tartaric acid.

8. The process of claim 6 wherein said additive is glycerol.

9. The process of claim 6 wherein said additive is citric acid.

10. The process of claim 6 wherein said additive is hydroxylamine chlorohydrate.

* * * * *